(12) United States Patent
Benko et al.

(10) Patent No.: US 9,857,915 B2
(45) Date of Patent: Jan. 2, 2018

(54) TOUCH SENSING FOR CURVED DISPLAYS

(75) Inventors: Hrvoje Benko, Seattle, WA (US);
Andrew Wilson, Seattle, WA (US);
Ravin Balakrishnan, Toronto (CA)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 913 days.

(21) Appl. No.: 12/122,736

(22) Filed: May 19, 2008

(65) Prior Publication Data
US 2009/0189857 A1 Jul. 30, 2009

Related U.S. Application Data

(60) Provisional application No. 61/023,433, filed on Jan. 25, 2008.

(51) Int. Cl.
G06F 3/042 (2006.01)

(52) U.S. Cl.
CPC .................................. G06F 3/0421 (2013.01)

(58) Field of Classification Search
CPC ......... G06F 3/042; G06F 3/036; G06F 3/0304
USPC ............. 345/158, 173, 174, 419, 6; 715/863
See application file for complete search history.

(56) References Cited

U.S. PATENT DOCUMENTS

| | | | |
|---|---|---|---|
| 5,945,985 A | 8/1999 | Babin et al. | |
| 5,990,990 A | 11/1999 | Crabtree | |
| 6,008,800 A * | 12/1999 | Pryor | 345/173 |
| 6,027,343 A | 2/2000 | Ho | |
| 6,064,423 A * | 5/2000 | Geng | 348/36 |
| 6,100,862 A | 8/2000 | Sullivan | |
| 6,278,419 B1 * | 8/2001 | Malkin | 345/31 |
| 6,449,887 B1 | 9/2002 | Song | |
| 6,527,555 B1 | 3/2003 | Storm | |
| 6,720,956 B1 | 4/2004 | Honma et al. | |
| 6,753,847 B2 * | 6/2004 | Kurtenbach et al. | 345/156 |
| 7,390,092 B2 * | 6/2008 | Belliveau | 353/30 |
| 2001/0012001 A1 * | 8/2001 | Rekimoto | G06F 3/0425 345/173 |
| 2005/0162381 A1 * | 7/2005 | Bell | G06F 3/0428 345/156 |
| 2006/0007170 A1 * | 1/2006 | Wilson et al. | 345/173 |
| 2006/0125822 A1 | 6/2006 | Kurtenbach et al. | |
| 2007/0159459 A1 | 7/2007 | Wang | |
| 2007/0247435 A1 | 10/2007 | Benko et al. | |
| 2007/0247439 A1 | 10/2007 | Daniel et al. | |

(Continued)

OTHER PUBLICATIONS

Balakrishnan, et al., "User Interfaces for Volumetric Displays", Mar. 2001. IEEE. pp. 37-45.

(Continued)

*Primary Examiner* — Nicholas Lee
(74) *Attorney, Agent, or Firm* — Medley, Behrens & Lewis, LLC

(57) ABSTRACT

Described herein is an apparatus that includes a curved display surface that has an interior and an exterior. The curved display surface is configured to display images thereon. The apparatus also includes an emitter that emits light through the interior of the curved display surface. A detector component analyzes light reflected from the curved display surface to detect a position on the curved display surface where a first member is in physical contact with the exterior of the curved display surface.

20 Claims, 12 Drawing Sheets

(56) References Cited

U.S. PATENT DOCUMENTS

| | | | | |
|---|---|---|---|---|
| 2008/0088593 | A1* | 4/2008 | Smoot | G06F 3/0425 345/173 |
| 2008/0150913 | A1* | 6/2008 | Bell et al. | 345/175 |
| 2008/0179507 | A2* | 7/2008 | Han | 250/224 |

OTHER PUBLICATIONS

"Actuality Systems" http://www.siggraph.org/s2002/exhibition/detail/400.html.
Kettner, et al., "Direct Rotational Interaction With a Spherical Projection", A Creativity and Cognition Symposium, 2004. 18 Pages.
Fuller, "The Geoscope", from Education Automation, 1962. http://www.vterrain.org/Misc/geoscope.html.
"Global Imagination", http://www.globalimagination.com/.
Companje, et al., "Globe4D, Time-Traveling with an Interactive Four-Dimensional Globe", MM'06, Oct. 23-27, 2006, Santa Barbara, California, USA. 2 Pages.
"iBall+" http://www.audiovisualizers.com/library/store/iball/iball.htm.
"OmniGlobe® Technology" ARC Science Simulations http://www.arcscience.com/systemDetails/omniTechnology.html.
"The OmniGlobe: A Self-Contained Spherical Display System" Emerging Technologies—SIGGRAPH 2003. http://www.siggraph.org/s2003/conference/etech/omniglobe.html.
"Science on a Sphere" http://sos.noaa.gov/.
Buckminster, "The Geoscope", Critical Path 1981. http://www.well.com/user/abs/geoscope.html.
Leary, "Video Projections on a Globe Make Planetary Data Click" Published: Jun. 13, 2006. http://www.nytimes.com/2006/06/13/science/13sphe.html?_r=4&adxnnl=1&oref=slogin&adxnnlx=1195256110-XUjoB4n89dZC5/zH5rkocQ&oref=slogin&oref=slogin.
"Videoglobe", http://www.videoinmotion.com/VideoGlobePage.htm.
Wu, et al, "Multi-Finger and Whole Hand Gestural Interaction Techniques for Multi-User Tabletop Displays". 2003, ACM UIST. pp. 193-202.
Chan, et al., "Gesture-based Interaction for a Magic Crystal Ball". 2007, ACM VRST. pp. 157-164.
Chen, et al., "Flexible Active-Matrix Electronic Ink Display", 2003. Nature 423. p. 136.
Dietz, et al., "DiamondTouch: A Multi-User Touch Technology", 2001, ACM UIST. pp. 219-226.
Fitzmaurice, et al., "Sentient data Access via a Diverse Society of Devices". 2003. ACM Queue. pp. 53-62.
Grossman, et al., "Multi-Finger Gestural Interaction with 3D Volumetric Displays", 2004. ACM UIST. pp. 61-70.
Grossman, et al., "The Design and Evaluation of Selection Techniques for 3D Volumetric Displays", 2006. ACM UIST. pp. 3-12.
Han, "Low-cost Multi-touch Sensing Through Frustrated Total Internal Reflection", 2005. ACM UIST. pp. 115-118.
Kruger, et al., "How People Use Orientation on Tables: Comprehension, Coordination and Communication", 2003, ACM SIGGROUP Conference on Supporting Group Work. pp. 369-378.
Liang, et al., "A Highly Interactive 3D Modeling System", 2004, Computers and Graphics. 18 (4). pp. 499-506.
Marchese, et al., "A Projected Hemispherical Display with a Gestural Interface", 2006, ACM SIGGRAPH Research Posters.
Matsushita, et al., "HoloWall: Designing a Finger, Hand, Body, and Object Sensitive Wall", 1997, ACM UIST. pp. 209-210.
Morris, et al., "Beyond "Social Protocols": Multi-User Coordination Policies for Co-located Groupware". 2004. ACM CSCW, pp. 262-265.
PufferSphere by Pufferfish http://www.pufferfishdisplays.co.uk/.
Rekimoto, "SmartSkin: An Infrastructure for Free-hand Manipulation on Interactive Surfaces", 2002. ACM CHI. pp. 113-120.
Scott, et al., "Territoriality in Collaborative Tabletop Workspaces", 2004. ACM CSCW, pp. 294-303.
Shen, et al., "DiamondSpin: An Extensible Toolkit for Around-the-Table Interaction", ACM, CHI. pp. 167-174.
Shoemake, "Animating Rotation with Quaternion Curves", 1985. ACM SIGGRAPH. pp. 245-253.
Shoemake, "ARCBALL: A User Interface for Specifying Three-Dimensional Orientation Using a Mouse", 1992. Graphics Interface. pp. 151-156.
Ushida, et al.,"i-ball2: An Interaction Platform with a Crystal-ball-like Display for Multiple Users", 2003. International Conference on Artificial Reality and Teleexistence.
Wilson, "TouchLight: An Imaging Touch Screen and Display for Gesture-Based Interaction", 2004. ICMI Conference on Multimodal Interfaces. pp. 69-76.
Wilson, "PlayAnywhere: A Compact Tabletop Computer Vision System", 2005. ACM UIST. pp. 83-92.

* cited by examiner

TOUCH SENSING FOR CURVED DISPLAYS

RELATED APPLICATION

This application claims the benefit of U.S. Provisional Application No. 61/023,433, filed Jan. 25, 2008, and entitled "TOUCH SENSING FOR CURVED DISPLAYS", the entirety of which is incorporated herein by reference.

BACKGROUND

Touch screen technology has advanced in recent years such that touch screen technology can be found in many consumer level devices and applications. For example, banking machines often include touch sensitive graphical user interfaces that allow users to select a function and an amount for withdrawal or deposit. In another example, personal data assistants may include touch screen technology, wherein such technology can be employed in connection with user-selection of graphical icons on an interactive interface with the use of a stylus. In still yet another example, some laptop computers are equipped with touch screen technology that allow users to generate signatures, select applications, and perform other tasks with the use of a stylus.

The popularity of touch screen technology has increased due to ease of use, particularly for novice computer users. For instance, novice computer users may find it more intuitive to select a graphical icon by hand than to select the icon through use of various menus and a pointing and clicking mechanism, such as a mouse. In currently available systems users can select, move, modify, or perform other tasks on objects that are visible on a display screen by selecting such objects (e.g., with a stylus or their finger).

SUMMARY

The following is a brief summary of subject matter that is described in greater detail herein. This summary is not intended to be limiting as to the scope of the claims.

Various technologies relating to touch screen apparatuses are described in detail herein. Further, technologies relating to touch screen functionality on a curved display surface are described herein. Moreover, various technologies relating to multi-touch functionality in connection with a curved display surface are described herein.

A curved display surface can be used to display graphics, images, text, etc. to one or more users. In an example, the curved display surface may be diffuse in nature and/or may be at least a portion of a spherical display. A projector can be configured to project images that are displayed on the curved display surface. In an example, the projector may project images onto the display surface by way of a wide-angle lens. An emitter may be configured to emit non-visible light through the curved display surface. In an example, an optical path of light output by the projector and an optical path of light output by the emitter can be substantially equal.

With more detail regarding the emitter, such emitter may include one or more light emitting diodes that emit infrared light through the curved display surface. It is understood, however, that other sources for emitting non-visible light are contemplated, including other types of semiconductor lighting devices, light bulbs, laser devices, amongst other technologies. When one or more members, such as fingers of one or more users, are in physical contact with the curved display surface, light emitted by the emitter can be reflected from the one or more members.

A detector component, which may be or include an infrared camera and image processing software, can analyze light reflected from the curved display surface to detect a position on the curved display surface where one or more members are in physical contact with the curved display surface. Once it is determined that a member (e.g., a finger) is in physical contact with the curved display surface, the position of such member can be tracked as the position of the member changes. The projector may then be controlled based at least in part upon the detected position of the member as well as tracked position changes of the member.

Pursuant to a particular example, the curved display surface may be a spherical display that includes an aperture. A ring of light emitting diodes that emit infrared light may be positioned inside the spherical display and around the aperture, such that infrared light emitted by the light emitting diodes is emitted throughout a majority of the spherical display (e.g., substantially the entirety of the screen surface of the spherical display). A wide-angle lens may be positioned in the aperture, wherein the wide-angle lens may facilitate display of images, graphics, text, etc. on substantially all of the spherical display as well as capture of images of substantially all of the spherical display.

A wavelength filter, such as a cold mirror, can be used to reflect visible light output by the projector while allowing non-visible light reflected from one or more members to pass through the wavelength filter. More particularly, the projector can be positioned to relay visible light to the cold mirror, wherein the cold mirror is positioned to reflect the visible light through the wide-angle lens and onto a curved display surface (e.g., a spherical display surface). A detector component can receive images of the curved display surface and analyze reflections of light thereon to determine if one or more members are in physical contact with the curved display surface as well as position of the members on the curved display surface. Detected positions and movement of members in physical contact with the spherical display surface can be used to control images, graphics, etc. output by the projector. For instance, positions and movement of members can be used as input to an application that is associated with multi-touch functionality.

Other aspects will be appreciated upon reading and understanding the attached figures and description.

DETAILED DESCRIPTION

Figure 1:
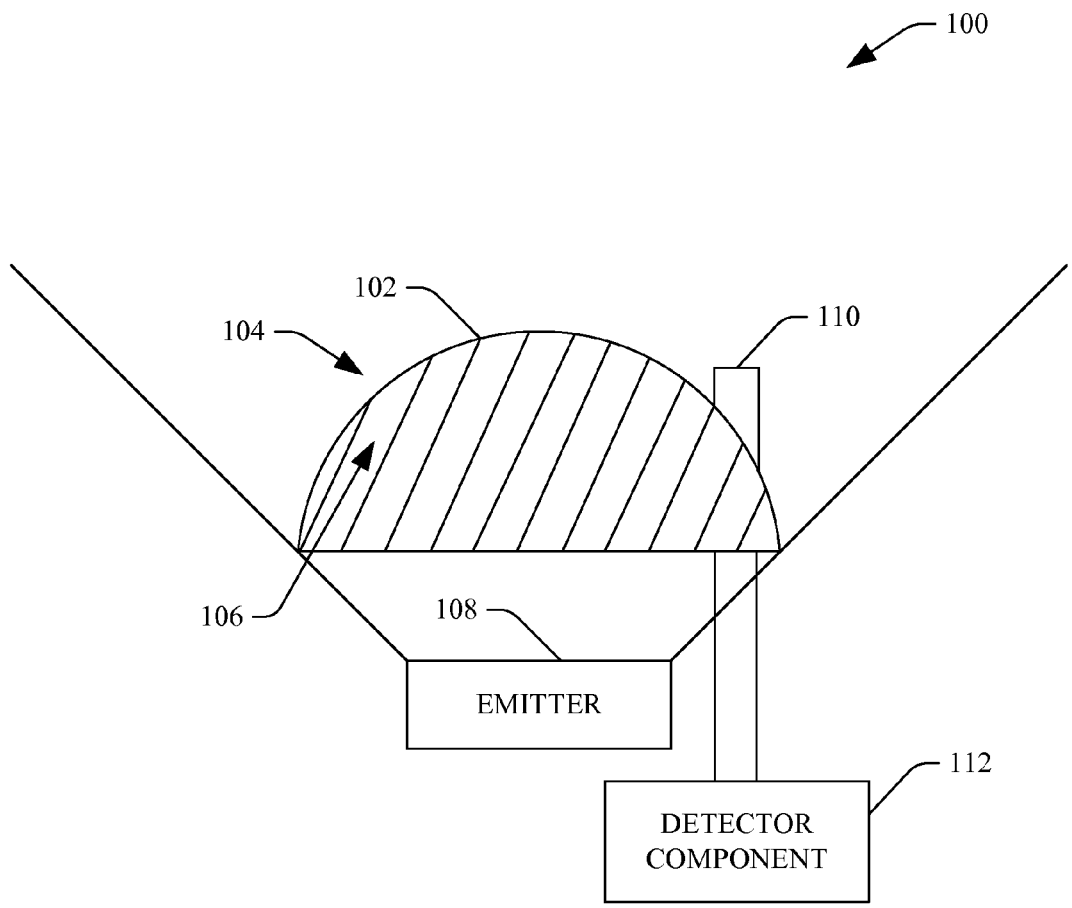
FIG. 1 is a functional block diagram of an example apparatus that facilitates detecting the position of a member that is in physical contact with a curved display surface.

Various technologies pertaining to touch screen technology in general, and multi-touch functionality in particular, will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example apparatus 100 that facilitates determining positions on a curved display surface where one or more members are in physical contact with the curved display surface is illustrated. The apparatus 100 includes a curved display surface 102 that has an exterior 104 and an interior 106. In an example, the curved display surface 102 may be diffuse in nature. The curved display surface 102 is configured to display images, graphics, text, and the like thereon. Pursuant to an example, the curved display surface 102 may be approximately spherical in nature or may be a portion of a sphere. The curved display surface 102 may also be some other irregularly shaped three-dimensional surface. While not shown, a projector may project images onto the curved display surface 102 such that the images are displayed on the exterior 104 of the curved display surface 102. The projector may be positioned to project visible light onto the interior 106 of the curved display surface 102, and the light may then diffuse such that images, graphics, text, etc. are visible on the exterior 104 of the curved display surface 102 to users of the apparatus. In another example, the projector may be positioned such that visible light is directed onto the exterior 104 of the curved display surface 102, wherein the exterior 104 is at least partially specular in nature.

The curved display surface 102 may be a single layer display surface or a multilayer display surface. Moreover, the curved display surface 102 may be diffuse in nature. The apparatus 100 also includes an emitter 108 that emits light through the curved display surface 102 (e.g., through the interior of the curved display surface. The emitter 108 may be or include one or more light emitting diodes, a cathode-ray tube, a laser, bulbs, or other suitable emitting device. Further, light emitted by the emitter may be in the non-visible spectrum, such as infrared light. While various examples described herein relate to the emitter 108 emitting light waves, it is understood that the apparatus 100 may be adapted such that the emitter 108 emits sonic waves, ultrasonic waves, or subsonic waves.

A member 110 may be in physical contact with the exterior 104 of the curved display surface 102. The member 110 may be a finger, a palm of a hand, a stylus, a card, or any other suitable object that can reflect light (e.g., infrared light). Light (or other type of wave including sound waves) emitted by the emitter 108 is reflected from the member 110. The apparatus 100 additionally includes a detector component 112 which captures waves (e.g., light waves) reflected from the member 110. For example, the detector component 112 can analyze light reflected from the curved display surface 104 to detect a position on the curved display surface 102 where the member 110 is in physical contact with the exterior 104 of the curved display surface 102. For example, the detector component 112 may include an apparatus that captures images of particular waves (e.g., light waves) reflected from the curved display surface 102. Pursuant to a particular example, the detector component 112 may include an infrared camera that continuously or nearly continuously captures images of the curved display surface 102. In another example, the detector component 112 may include an ultrasound detector that detects sound waves reflected from the member 110. The detector component 112 may additionally include a software library that facilitates tracking position of the member 110 as it moves over the curved display surface 102.

While the example apparatus 100 is illustrated as including single member 110 that is in physical contact with the curved display surface 102, it is to be understood that the detector component 112 can substantially simultaneously detect position of multiple members that are in physical contact with the curved display surface 102. As such, for instance, the detector component 112 can analyze light reflected from the curved display surface 102 to substantially simultaneously detect respective positions on the curved display surface 102 where a plurality of members are in physical contact with the exterior 104 of the curved display surface 102.

More particularly, in an example, an application corresponding to the apparatus 100 may allow numerous items to be displayed on the curved display surface 102, wherein the multiple items may be selected and acted upon by multiple members that may correspond to multiple users. For instance, the curved display surface 102 may graphically present numerous images to users on different sides of the curved display surface 102, wherein each user can substantially simultaneously select or act on one or more images. The apparatus 100 can facilitate detection of where on the curved display surface 102 multiple users are interacting with the images graphically presented on the curved display surface 102.

Furthermore, while the above example system describes light reflecting from the member 110, it is to be understood that the member 110 may be equipped with a mechanism that emits light, such as infrared light. In such a system, the emitter 108 may be unnecessary, since, rather than reflecting light emitted by the emitter 108, the member 110 can itself emit light that can be detected by the detector component 112. For instance, the member 110 may be a stylus with a tip switch, wherein when the tip switch comes into contact with (or proximate to) the curved display surface 102 the stylus emits infrared light. It is to be understood that multiple members can be substantially simultaneously detected while on the curved display surface, and position thereof can be tracked and used in connection with displaying images. Furthermore, for example, each member may emit infrared light with a particular pattern, such that each member may be uniquely identified.

Figure 2:
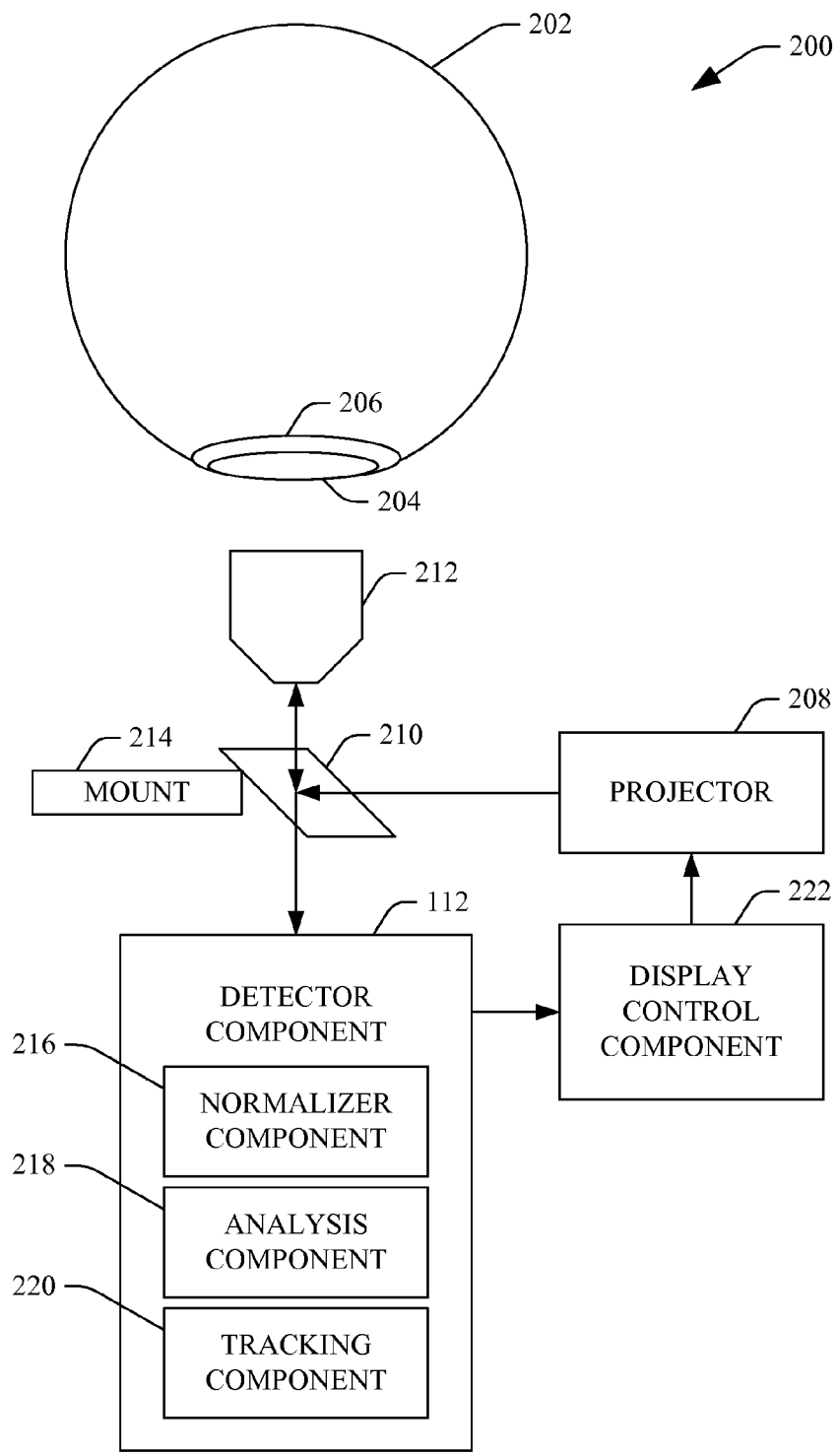
FIG. 2 is a functional block diagram of an example system that facilitates determining a position on a curved display surface of a member that is in physical contact with the curved display surface.

Referring now to FIG. 2, an example system 200 that facilitates determining a position or positions on a curved display surface where a member or members is in physical contact therewith is illustrated. The system 200 includes a substantially spherical display 202, which includes an aperture 204. While shown as being substantially spherical, it is understood that the display 202 may be some other form of curved surface. The substantially spherical display 202 is configured to display images, graphics, etc. on the exterior thereof, such that users of the display can be presented with images and interact with images on the substantially spherical display. A ring of non-visible wave emitting devices 206, such as light emitting diodes that emit light in a non-visible spectrum, is arranged in a ring-like manner around the exterior of the aperture 204. For instance, the wave emitting devices 206 may be positioned on the interior of the spherical display 202 and may direct non-visible light to substantially all of the substantially spherical display 202.

The system 200 can additionally include a projector 208 that may be configured to project images or graphics onto the exterior of the substantially spherical display 202. More particularly, a wavelength filter 210 can be positioned to reflect visible light emitted from the projector 208 towards the interior of the substantially spherical display 202, which may be diffuse in nature. In the example system 200, a wide-angle lens 212 facilitates projection of images, graphics, etc. on substantially all of the substantially spherical display 202. A mount 214, such as a three axis adjustable mount, can be used to position the wavelength filter 210 to appropriately direct images and/or graphics (including text) projected by the projector 208 onto the spherical display 202 (e.g., direct images or graphics into the interior of the substantially spherical display 202, wherein such display is diffuse, thereby facilitating presentment of images and/or graphics on the exterior of the display 202).

As noted above the wave emitting devices 206 may emit non-visible waves, such as infrared light, through the substantially spherical display 202. Accordingly, when a member is in physical contact with the display 202, non-visible waves may be reflected from the member into the wide-angle lens 212 (e.g., through the aperture 204). In another example, a device that converts sound waves into visible light waves or that captures images of sound waves can be included in the example apparatus 200. Pursuant to an example, the wavelength filter 210 can be configured to allow non-visible light to pass therethrough, and the detector component 112 can receive the non-visible light. For instance, the detector component 112 can capture images of light that passes through the wavelength filter 210. In an example, the detector component 112 may include an infrared camera and a software library that facilitates determining whether one or more members is in contact with the exterior of the substantially spherical display 202 and determining a position on the substantially spherical display 202 that the member is in contact with such display 202.

For instance, the detector component 112 may include a normalizer component 216 that normalizes images captured by the detector component 112. For example, it may be impossible or impractical for the wave emitting devices 206 to uniformly deliver non-visible waves (e.g., non-visible light) through the substantially spherical display 202. Therefore, non-visible waves may be reflected non-uniformly over different portions of the substantially spherical display 202. In other words, the detector component 112 may capture an image, wherein different portions of the image captured by the detector component 112 may be associated with different amounts of detected non-visible light. The normalizer component 216 normalizes captured images such that a normalized image is substantially uniformly black when there are no members in physical contact with the substantially spherical display 202. When one or more members are in physical contact with the substantially spherical display 202, the normalize component 216 can normalize a captured image such that each detected member in the captured image is assigned a substantially similar value (e.g., has a substantially similar amount of "brightness").

The detector component 112 may additionally include an analysis component 218 that can analyze normalized images generated by the normalizer component 216 to determine whether one or more members are in physical contact with the substantially spherical display 202. The analyzer component 218 can additionally determine where on the substantially spherical display 202 one or more members are in physical contact therewith.

The detector component 112 may also include a tracking component 220 that can detect position changes in detected members as well as velocity of position changes, acceleration of position changes, and the like. A display control component 222 controls output of the projector 208 based at least in part upon output of the analysis component 218 and/or the tracking component 220. For instance, it may be desirable to move a particular image on the substantially spherical display 202 if it is determined that a member is in physical contact with a particular portion of the substantially spherical display 202.

Pursuant to a specific example, the projector 208 may be projecting multiple images onto the substantially spherical display 202. For instance, the images may be photographs that are being viewed by multiple users. Each of the multiple users may independently have the ability to select a photograph and move it to a different position on the substantially spherical display 202 by touching a position on the display 202 that corresponds to a position on such display 202 where an image is displayed. The detector component 112, which may include the normalizer component 216, the analyzer component 218 and the tracking component 220, may determine where members are in physical contact with the display 202 and can track movement of the members that are in physical contact with the substantially spherical display 202. Thus, for instance, a first user may be touching a first location on the substantially spherical display 202 that corresponds to an image, and the user may desire to move it around the display 202 to a second position. The user can, for instance, cause such image to translate to the second position by moving his finger around the spherical display 202 (e.g., without losing physical contact therewith). This act may be similar to selecting and dragging an item as on a conventional computing device. The detector component 112 can continuously generate images of non-visible waves (e.g., infrared light) being reflected back through the aperture 204 into the wide-angle lens 212. The normalizer component 216 can normalize such images and the analysis component 218 can determine whether and where the member is in contact with the substantially spherical display 202. Once the analysis component 218 determines that a member (e.g., a finger) is in physical contact with the display 202, the tracking component 220 can determine how the member is being moved about the spherical display 202 (e.g., direction of movement, velocity, acceleration, . . . ). A display control component 222 can receive information from the analysis component 218 and the tracking component 220 and can control images output by the projector 208 based at least in part the received information. For instance, the display control component 222 can cause the projector component 208 to move the photographs as desired by users.

While the system 200 is illustrated as having a particular configuration, it is to be understood that such configuration is merely one example configuration amongst many possible configurations. For instance, rather than using a wide-angle lens to facilitate projection of images onto the spherical display 202, one or more mirrors may be employed. For instance, the projector 208 may be positioned to direct light through the aperture 204, and a mirror can be positioned at a pole of the spherical display opposite the aperture 204. The mirror can be positioned and configured to facilitate projection of images onto substantially the entirety of the display 202. In yet another example, one or more projectors may be positioned such as to direct light onto the exterior of the substantially spherical display 202, wherein the substantially spherical display may be at least partially specular. Of course, various other configurations are contemplated and will be apparent, and the hereto-appended claims are not intended to be limited by the example configurations described herein.

Figure 3:
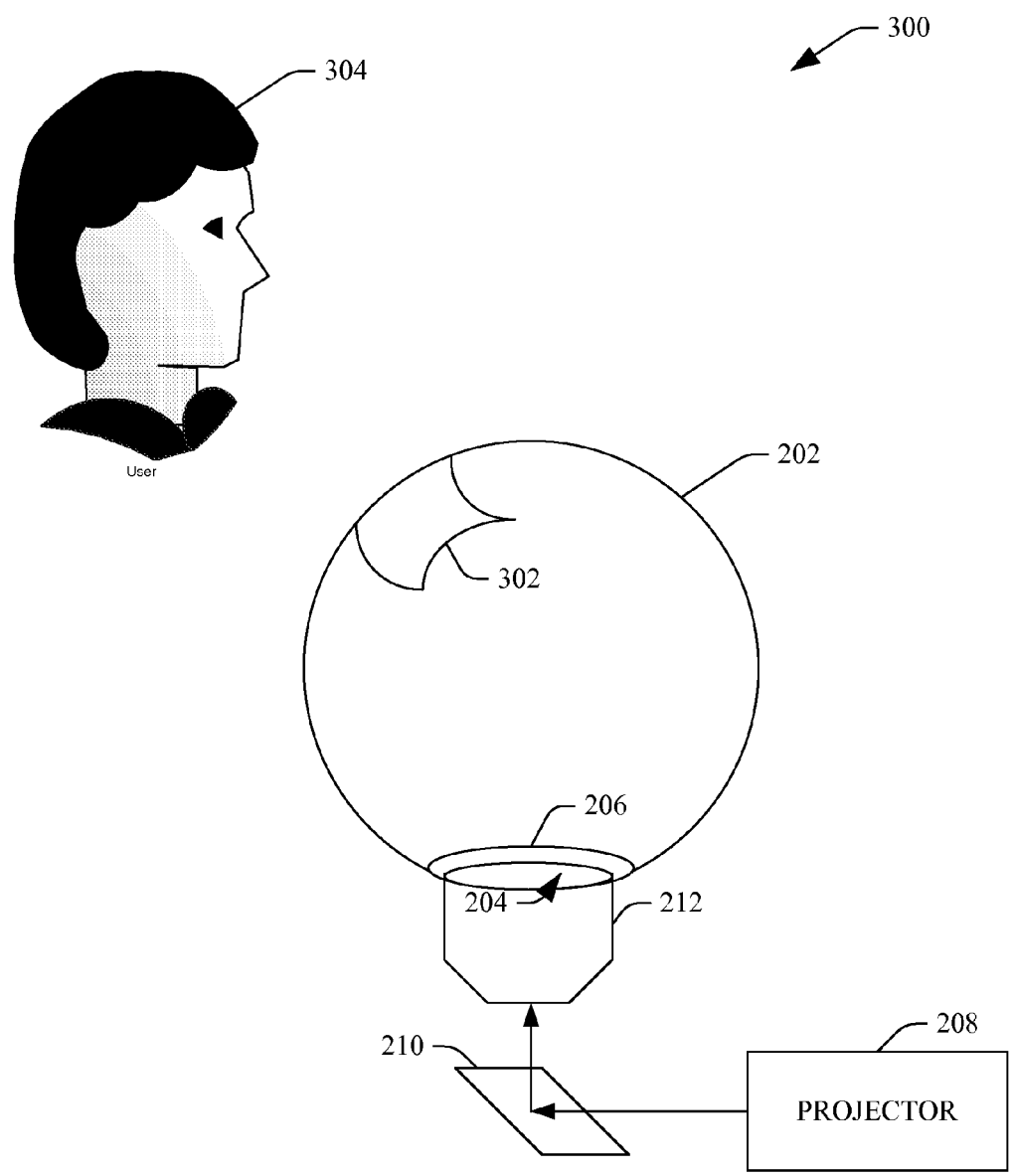
FIG. 3 is a functional block diagram of an example system that facilitates projecting graphics onto a spherical display.

Turning now to FIG. 3, an example system 300 that facilitates projecting images onto a curved display (such as a substantially spherical display) is illustrated. The system 300 includes the projector 208 which projects images that are desirably displayed on the substantially spherical display 202. The wavelength filter 210, which may be a cold mirror, reflects images output by the projector into the wide-angle lens 212. The wide-angle lens 212 is positioned in the aperture 204 such that substantially all of the substantially spherical display 202 can be illuminated with images, graphics, etc., if desired. In this example, the projector 208 is shown as projecting an image of a photograph 302 onto the substantially spherical display 202, wherein the photograph 302 is projected such that a user 304 can review the photograph 302. As described herein, the user 304 may select the photograph 302 and displace the photograph 302 to another position on the spherical display 202, may enlarge the photograph 302, may rotate the photograph 302, or perform other functions by touching the substantially spherical display 202. As noted above, position, direction of movement, velocity of movement, acceleration of movement, etc. of one or more members that are in contact with the display can be determined, and such information can be used as input to an application that facilitates projection of images, graphics, etc. on the substantially spherical display 202.

Figure 4:
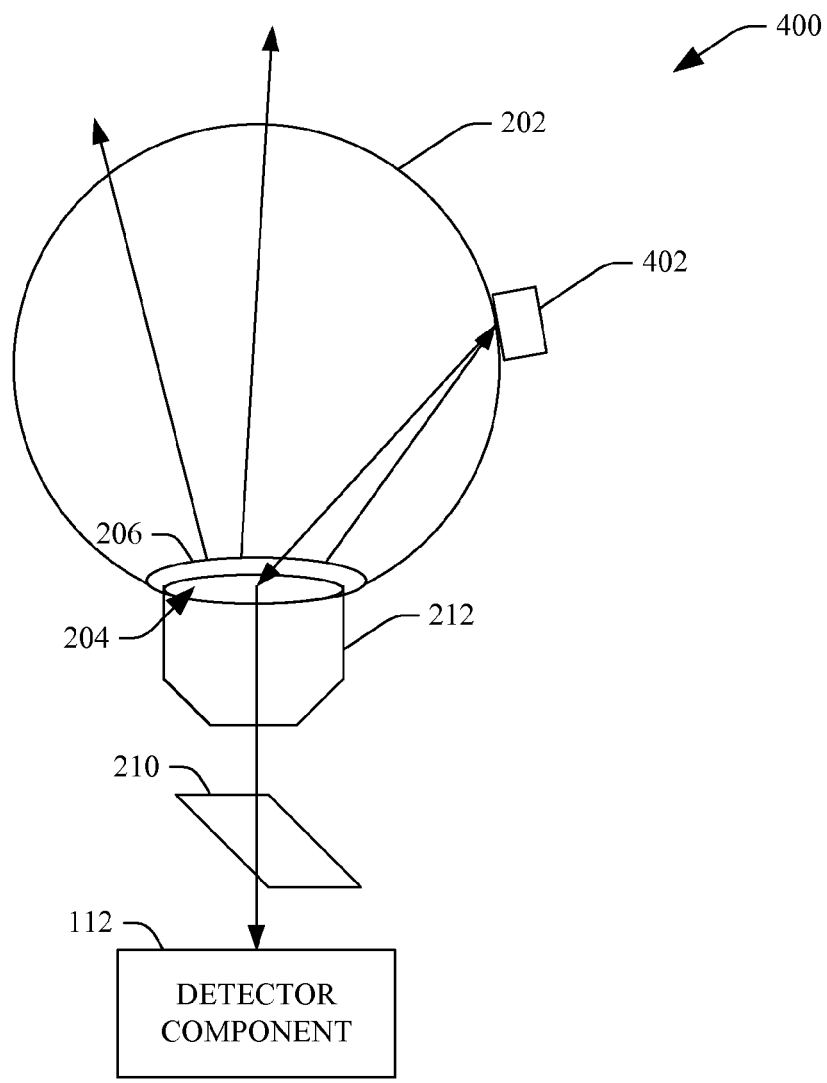
FIG. 4 is a functional block diagram of an example system that facilitates detecting a position of a member that is in physical contact with a substantially spherical display.

With reference now to FIG. 4, an example system 400 that facilitates detecting that a member 402 is in physical contact with the substantially spherical display 202 and further determining a position on the substantially spherical display 202 that a member is in physical contact therewith is illustrated. The wave emitting devices 206, as noted above, can employ light-emitting diodes that may be configured in a ring-like manner around the exterior of the aperture 204 and can emit non-visible light through substantially all of the substantially spherical display 202. For example, as shown in FIG. 4, non-visible light waves emitted by the wave emitting devices 206 can pass through the substantially spherical display 202, since the substantially spherical display 202 may be diffuse in nature.

In an example, a member 402 may be in physical contact with the substantially spherical display 202. The member 402 can reflect waves that have been emitted by the wave emitting devices 206, and such reflected waves (e.g., reflected non-visible light) is received by the wide-angle lens 212. For instance, non-visible light received by the wide-angle lens 212 can pass through the wavelength filter 210 and can be captured by the detector component 112, which may be or include an infrared camera. Images captured by the detector component 112 may then be used to determine where on the substantially spherical display 202 the member 402 is in physical contact therewith. In this example configuration, substantially all of the spherical display can be monitored to determine where and whether a member is in contact with the substantially spherical display 202.

Figure 5:
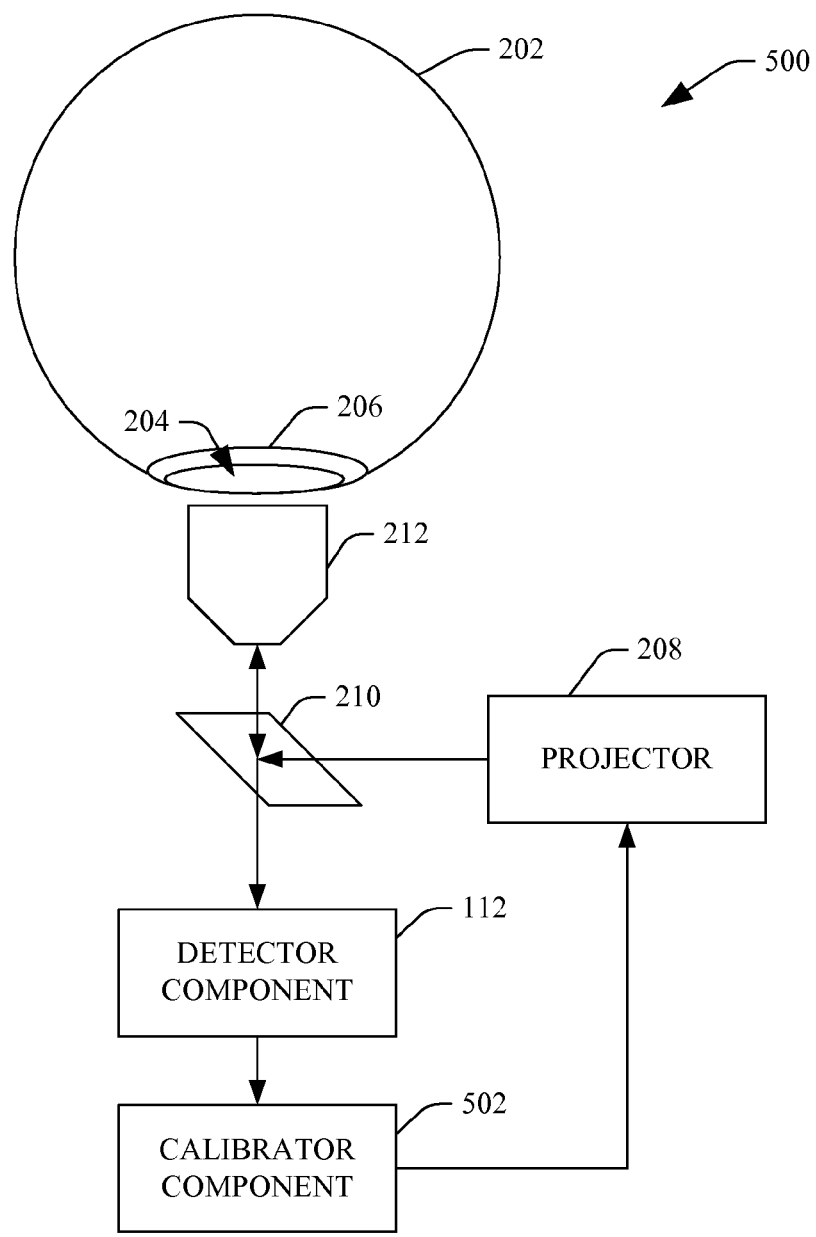
FIG. 5 is an example system that facilitates aligning a projector and a detector component when used in connection with a curved display surface.

Now referring to FIG. 5, an example system 500 that facilitates calibrating the detector component 112 with the projector 208 is illustrated. The system 500 includes the substantially spherical display 202 with the aperture 204, the wave emitting devices 206, the projector 208, the wavelength filter 210, the wide-angle lens 212, and the detector component 112 which act in conjunction as described above. In this example, the optical axis associated with projected images output by the projector 208 and non-visible waves emitted by the wave emitting devices 206 is substantially similar. Since, however, the optical axis associated with the projector 208 and the optical axis associated with the wave emitting devices 206 may not be identical, calibration may be desirable. In addition, calibration may be desired with respect to orientation of the projector 208 and the wave emitting devices 206 (e.g., a location of the Greenwich line).

The system 500 may include a calibrator component 502 that facilitates calibrating the projector 208 and the detector component 112, such that a coordinate system used by the projector 208 to project images and a coordinate system used by the detector component 112 to detect members correspond. Pursuant to an example, the calibrator component 502 may cause the projector 208 to display various longitudinal and latitudinal lines on the spherical display 202. A user interface displayed on the spherical display 202 may request that a user touch particular latitudinal/longitudinal intersections to enable calibration of the projector 208 and the detector component 112. Other manners of calibrating the projector 208 with the detector component 112, such as modifying a three-axis mount that maintains position of a cold mirror, are contemplated by the inventors and are intended to fall under the scope of the hereto appended claims.

Figure 6:
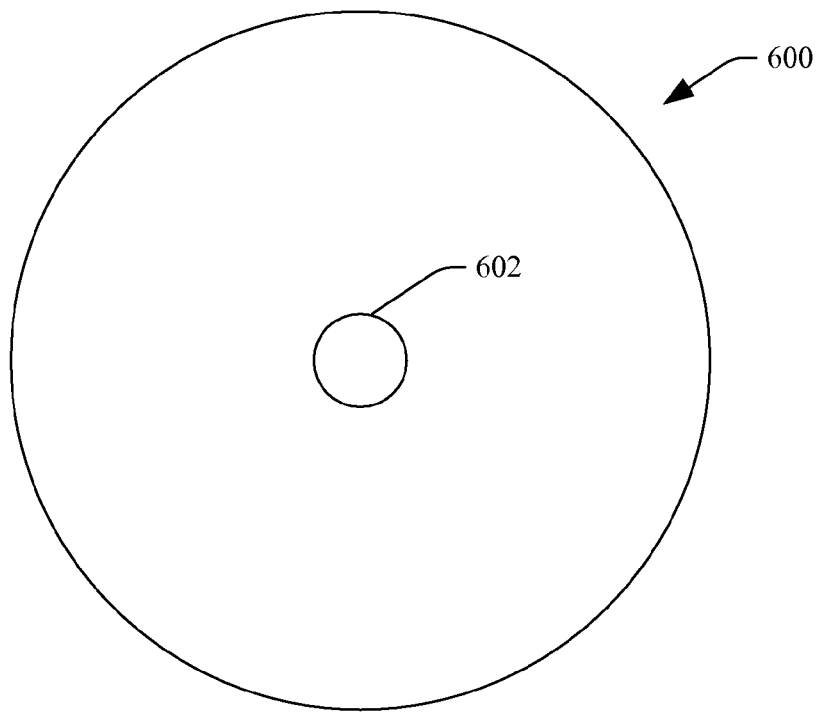
FIG. 6 is an example graphical depiction of a non-normalized image.

Turning now to FIG. 6, an example image captured by the detector component 112 is illustrated. The image 600 is an image that has not been subject to normalization. Therefore the image 600 includes one or more portions 602 that correspond to detection of a greater amount of reflected light than other portions of the image 600, even when a member is not in physical contact with a curved display surface. Such portion 602 results from non-uniform coverage of non-visible light of the spherical display 202.

Figure 7:
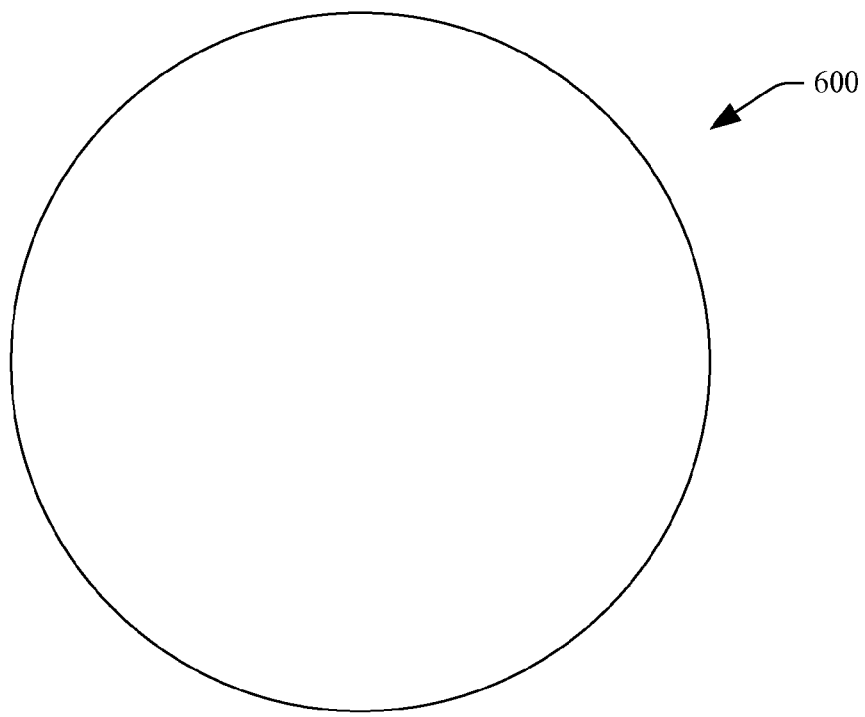
FIG. 7 is an example graphical depiction of a normalized image.

With reference now to FIG. 7 the example image 600 is illustrated after normalization has been undertaken on such image 600. Thus when a member is not in physical contact with the spherical display the image 600 is substantially entirely black. If a group of pixels in the normalized image 600 is determined to be associated with a level of "brightness" that is above a threshold, then a determination may be made that a member is in physical contact with the spherical display 202 at a position thereon that corresponds to the aforementioned pixels.

Figure 8:
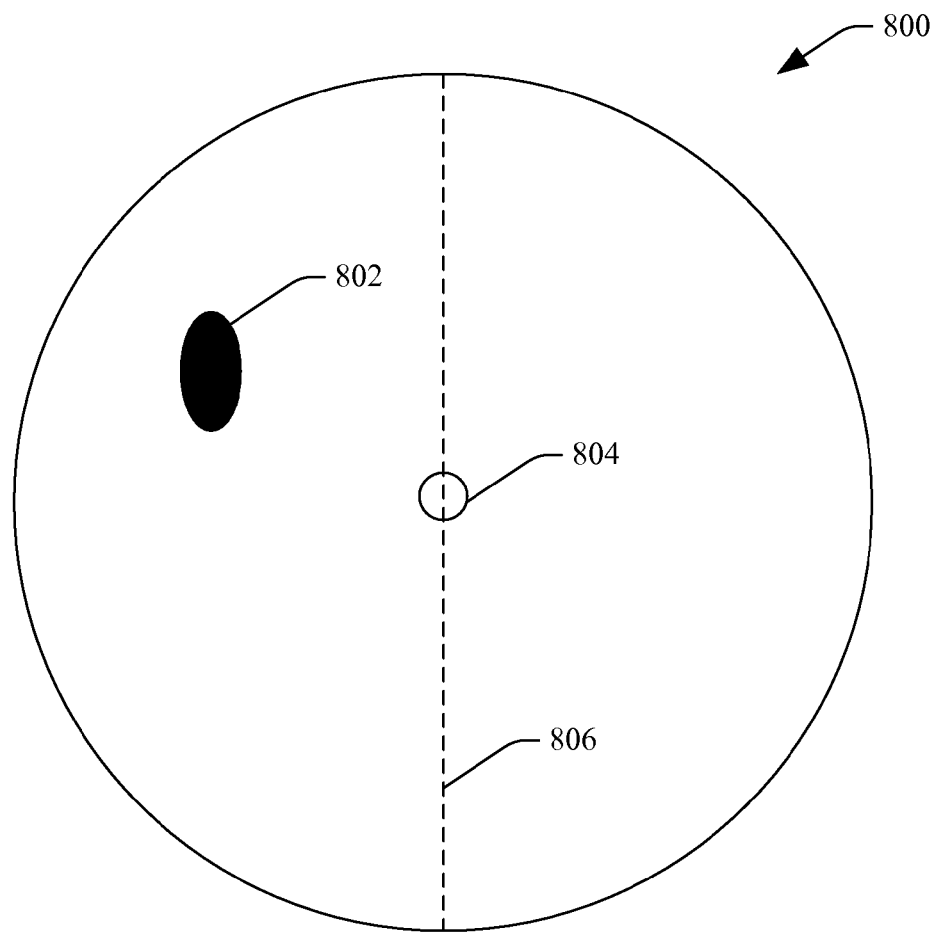
FIG. 8 is an example graphical depiction of a member which has been detected as being in physical contact with a substantially spherical display.

Turning now to FIG. 8, an example image 800 captured by the detector component 112 is illustrated where a member is in physical contact with a curved display surface. An ellipse 802 on the image 800 is indicative of where on a curved display surface a member is in physical contact with such curved display surface. For ease of explanation, a pole 804 of a curved display is overlaid on the image 800. A distance from the pole 804 to the ellipse 802 is indicative of where on the curved display surface the member is in physical contact with such curved display surface. A known longitudinal line 806 is also overlaid on the image 800 for explanatory purposes. Since the longitudinal line 806 is known, a latitudinal/longitudinal coordinate of pixels that are associated with the ellipse 802 can also be known. These latitudinal/longitudinal coordinates can be used to determine where the member is in physical contact with the display surface and to determine what image output by the projector is being selected by the member. It is to be understood, however, that other coordinate systems, including a Cartesian coordinate system, a Polar coordinate system, etc. can be used to determine where a member is in physical contact with a curved display surface. In addition, translation between coordinate systems is contemplated.

With reference now to FIGS. 9-12, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 9:
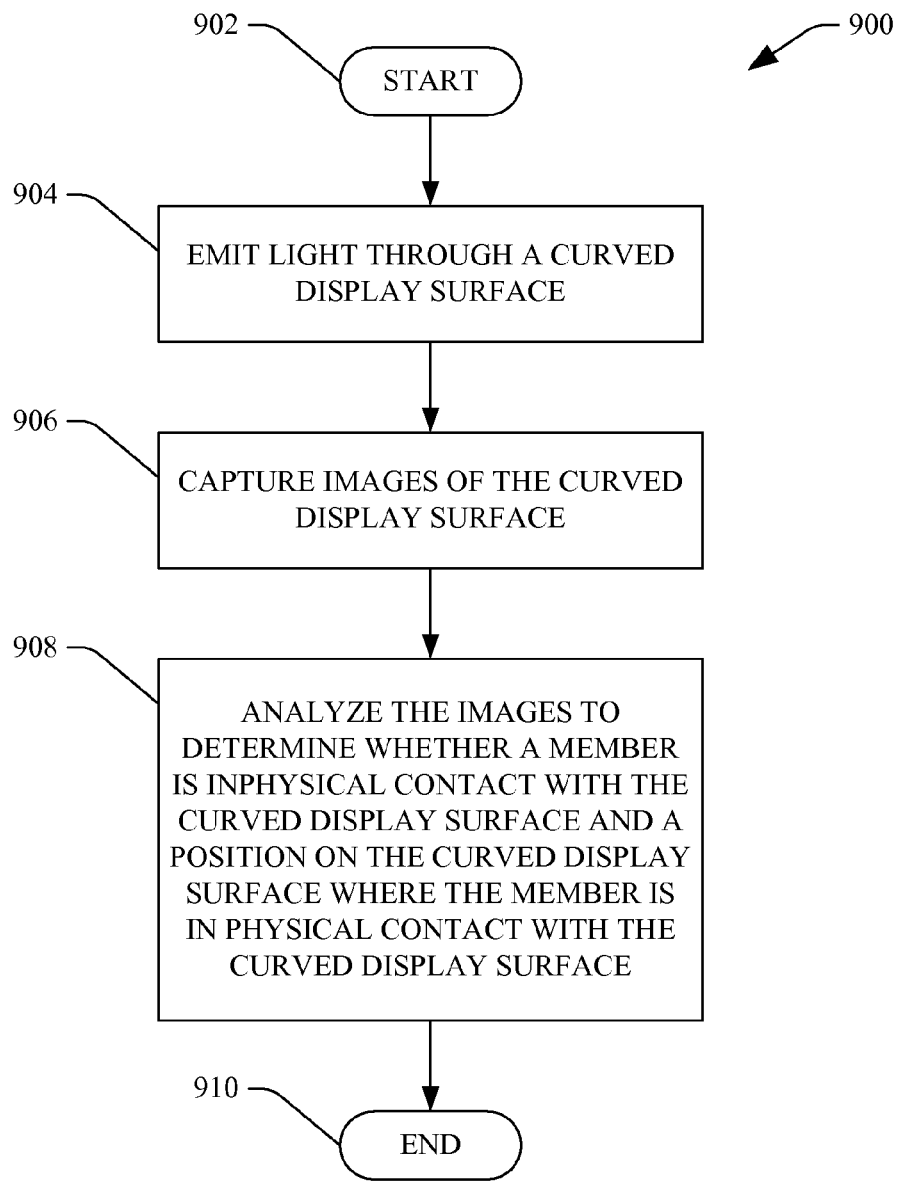
FIG. 9 is flow diagram that illustrates an example methodology for determining whether a member is in physical contact with a curved display surface.

Referring now to FIG. 9, a methodology 900 that facilitates determining whether a member is in physical contact with a curved display surface as well as determining a position on the curved display surface where a member is in physical contact therewith is illustrated. The methodology 900 begins at 902, and at 904 light is emitted through a curved display surface. For example, the light may be non-visible light such as infrared light, microwave light or the like. Moreover the light may be emitted by a light emitting diode, a cathode-ray tube, a laser, a bulb, or other suitable device.

At 906, images of the curved display surface are captured. For instance, an infrared camera may be used to capture images of the curved display surface.

At 908, the images are analyzed to determine whether a member is in physical contact with the curved display surface. For instance, the member may be a finger of a user. In addition, the images can be analyzed to determine where on the curved display surface the member is in contact therewith. While not shown and described as such, the methodology 900 may be used to determine where multiple members are in physical contact with a curved display surface. In addition, the methodology 900 may be used in connection with determining actions of multiple members that are in physical contact with a curved display surface (e.g., direction of travel of members, velocity of travel of members, acceleration of members, . . . ). Thus, the methodology 900 may be used in connection with multi-touch applications. The methodology 900 completes at 910.

Figure 10:
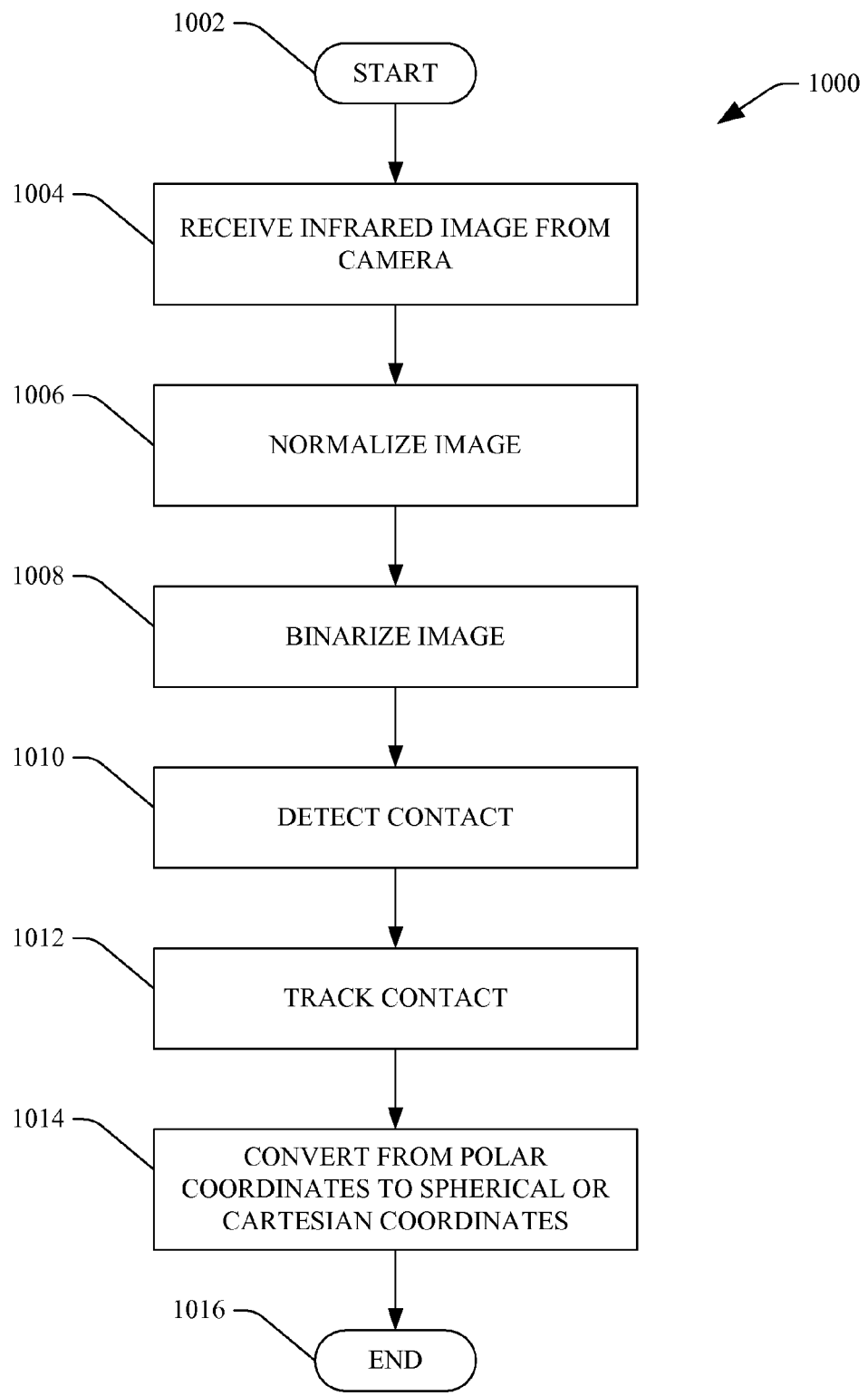
FIG. 10 is a flow diagram that illustrates an example methodology for processing captured images in connection with a substantially spherical display.

With reference now to FIG. 10, an example methodology 1000 for performing image processing on a captured image is illustrated. The methodology 1000 starts at 1002, and at 1004 an image is received from an infrared camera. Pursuant to an example, a wide-angle lens may be used in connection with capturing the image. At 1006 the image is normalized.

At 1008, the image is binarized. Therefore pixels assigned a first level correspond to a member in physical contact with the curved display surface while pixels assigned a second level correspond to positions on the curved display surface where no member is in physical contact with the curved display surface.

At 1010, a contact point is detected wherein a contact point corresponds to a member that is in physical contact with the curved display surface. The contact point can be detected by locating a pixel or pixels that correspond to the aforementioned first level.

At 1012, the detected contact is tracked such as to determine a change in position of the detected contact, a velocity associated with the change in position, an acceleration associated with the change in position and/or the like. For example, such information may be used by an application to position graphical images on the curved display surface and/or reposition graphical images on a curved display surface.

At 1014, polar coordinates associated with the detected contact are converted to a different coordinate system, such as latitudinal/longitudinal coordinate system or a Cartesian coordinate system. The methodology at 1000 ends at 1016.

Figure 11:
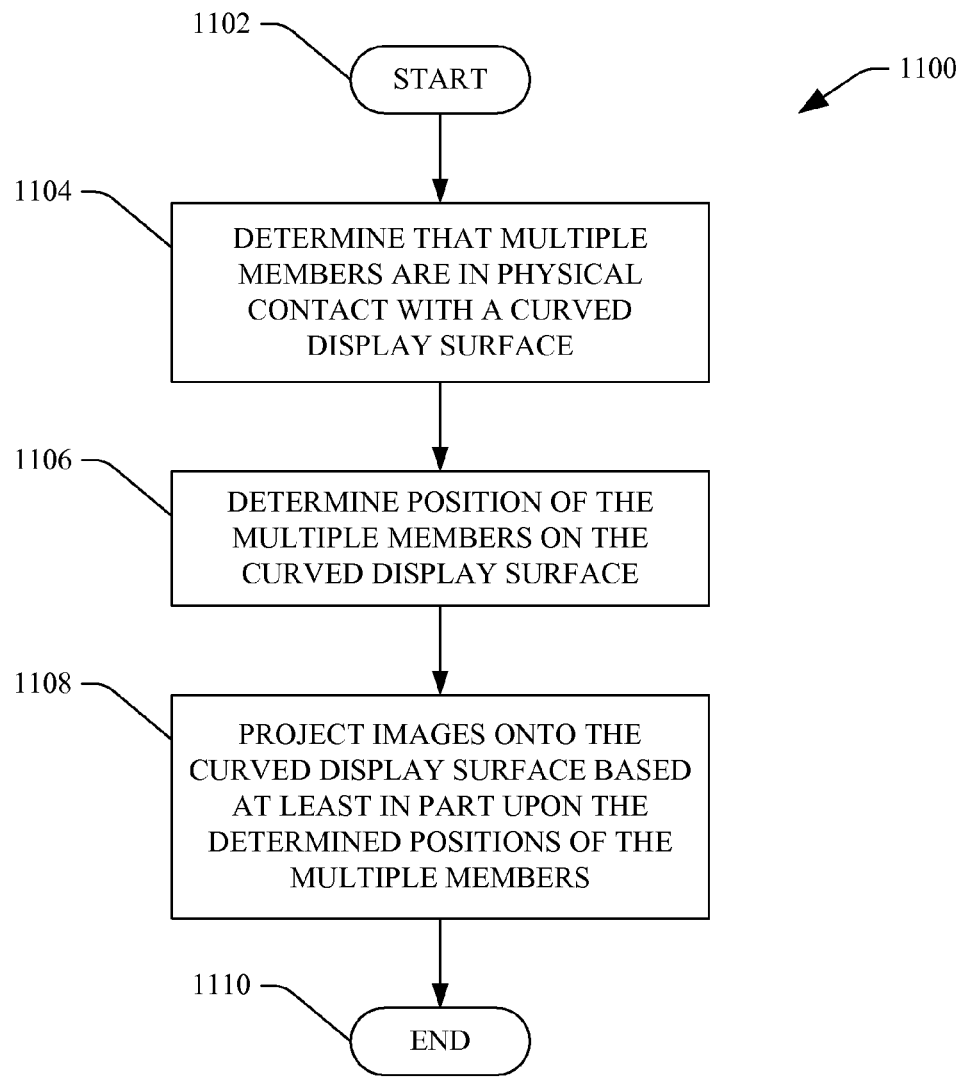
FIG. 11 is an example flow diagram that illustrates a methodology for projecting images onto a curved display surface based at least in part upon determined positions of multiple members in physical contact with the curved display surface.

Now referring to FIG. 11, an example methodology 1100 for projecting images onto a curved display surface is illustrated. The methodology 1100 starts at 1102, and at 1104 a determination is made that multiple members are in physical contact with a curved display surface. Such determination has been described in detail supra. At 1106, positions of the multiple members on the curved display surface are determined. At 1108, images are projected onto the curved display surface based at least in part on the determined positions of the multiple members. The methodology then completes at 1110.

Figure 12:
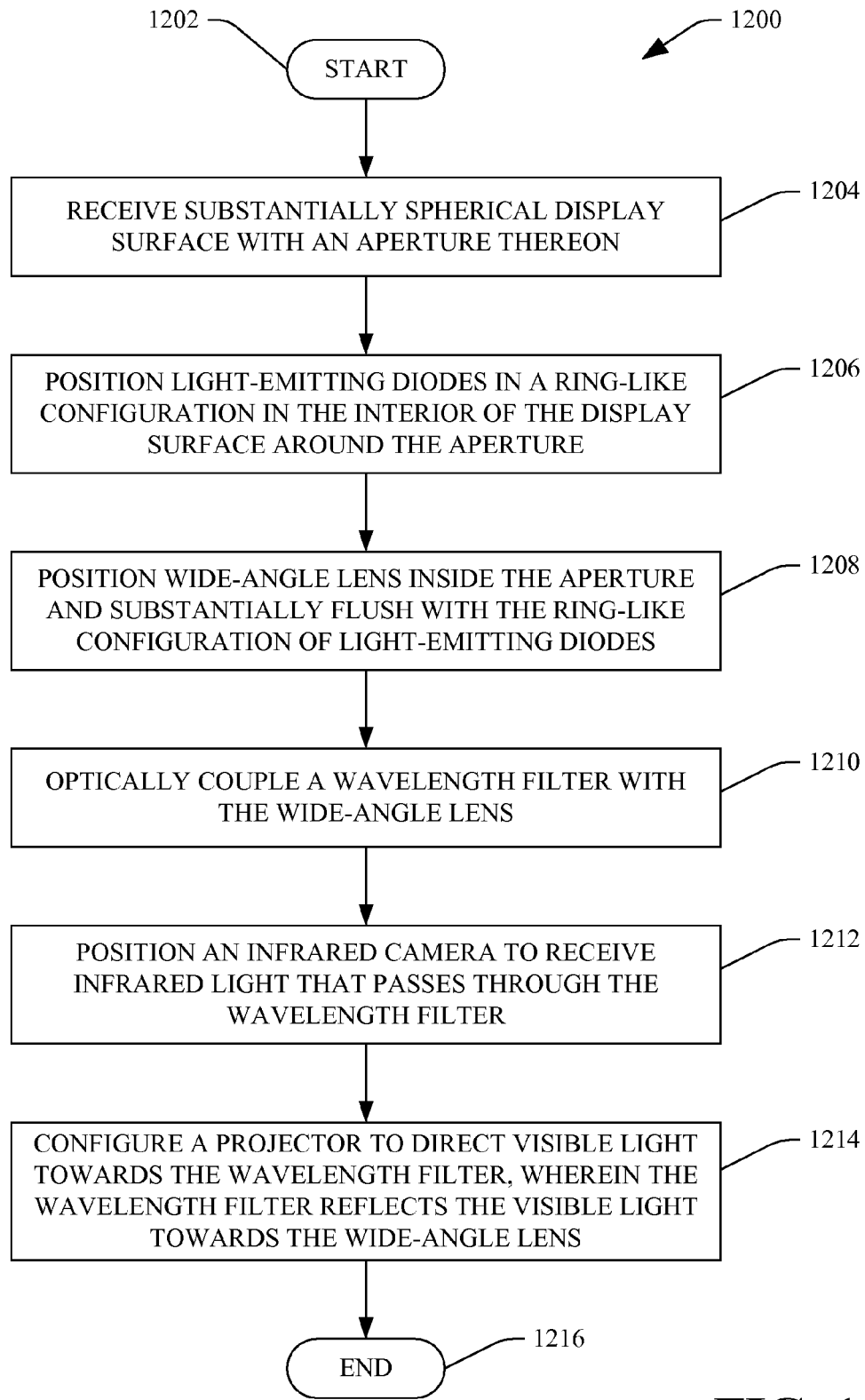
FIG. 12 is an example flow diagram that illustrates a methodology for configuring an interactive multi-touch apparatus.

With reference now to FIG. 12, an example methodology 1200 that facilitates configuring a multi-touch interactive apparatus with a curved display surface is illustrated. The methodology 1200 starts at 1202, and at 1204 a substantially spherical display surface with an aperture thereon is received. Pursuant to an example, the display surface may be diffuse in nature. At 1206, light emitting diodes are positioned on the interior of the substantially spherical display surface in a ring-like configuration around the aperture, wherein the light-emitting diodes are configured to emit non-visible light throughout substantially the entirety of the interior of the substantially spherical display surface. At 1208, a wide-angle lens is positioned inside the aperture and substantially flush with the light-emitting diodes.

At 1210, a wavelength filter, such as a cold mirror, is optically coupled to the wide-angle lens, wherein infrared light received by way of the wide angle lens passes through the wavelength filter. At 1212, an infrared camera is positioned to capture images of infrared light that pass through the wavelength filter.

At 1214, a projector is configured to direct visible light to the wavelength filter, wherein the wavelength filter is positioned to reflect the visible light from the projector towards the wide-angle lens. Moreover, the wavelength filter can be configured such that visible light reflected therefrom and infrared light that passes therethrough shares a substantially similar optical axis. The methodology 1200 then completes at 1216.

Figure 13:
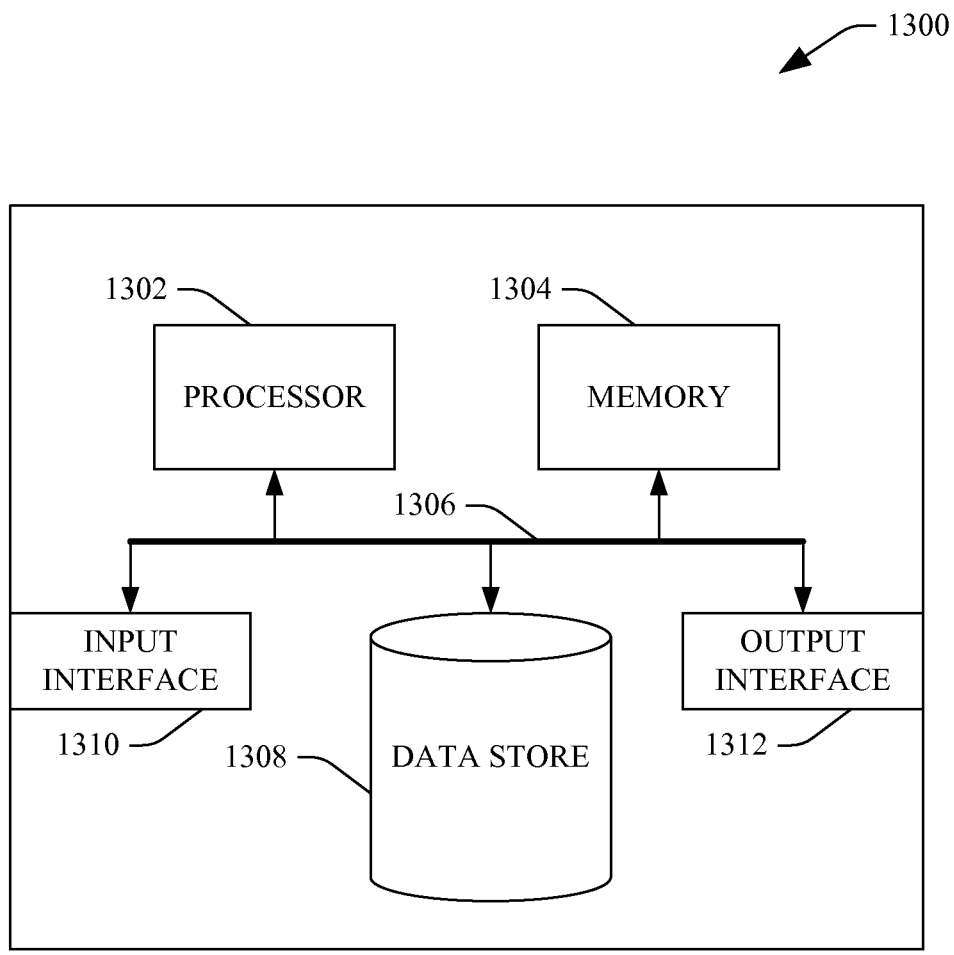
FIG. 13 is an example computing system.

Now referring to FIG. 13, a high-level illustration of an example computing device 1300 that can be used in accordance with the systems and methodologies disclosed herein is illustrated. For instance, the computing device 1300 may be used in a system that supports multi-touch functionality. In another example, at least a portion of the computing device 1300 may be used in a system that supports multi-touch functionality with a curved display. The computing device 1300 may be or include a dedicated graphics rendering system, for instance. The computing device 1300 includes at least one processor 1302 that executes instructions that are stored in a memory 1304. The instructions may be, for instance, instructions for implementing functionality described as being carried out by one or more components discussed above or instructions for implementing one or more of the methods described above. The processor 1302 may access the memory by way of a system bus 1306. In addition to storing executable instructions, the memory 1304 may also store images, graphics, etc.

The computing device 1300 additionally includes a data store 1308 that is accessible by the processor 1302 by way of the system bus 1306. The data store 1308 may include executable instructions, image data, normalized images, etc. The computing device 1300 also includes an input interface 1310 that allows external devices to communicate with the computing device 1300. For instance, the input interface 1310 may be used to receive instructions from an external computer device, receive a new application from an external computing device, etc. The computing device 1300 also includes an output interface 1312 that interfaces the computing device 1300 with one or more external devices. For example, the computing device 1300 may display images by way of the output interface 1312.

Additionally, while illustrated as a single system, it is to be understood that the computing device 1300 may be a distributed system. Thus, for instance, several devices may be in communication by way of a network connection and may collectively perform tasks described as being performed by the computing device 1300.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A display apparatus, comprising:
   a diffuse spherical display that defines an interior region of the display apparatus, the diffuse spherical display having an interior surface, an exterior surface, and an aperture;
   a ring-like configuration of light emitters positioned around the aperture in the interior region of the display apparatus, the light emitters configured to emit infrared light through the interior region towards the interior surface of the diffuse spherical display, the infrared light passes through the interior surface and then passes through the exterior surface of the diffuse curved display;
   a wide-angle lens that is positioned inside the aperture and flush with the ring-like configuration of light emitters;
   a wavelength filter that is optically coupled to the wide-angle lens, wherein infrared light received by way of the wide-angle lens passes through the wavelength filter;
   an infrared camera that is optically coupled to the wavelength filter and the wide-angle lens, the infrared camera is configured to receive infrared light that passes through the wavelength filter; and
   a projector that is optically coupled to the wavelength filter, wherein the wavelength filter reflects visible light emitted from the projector through the wide-angle lens such that the visible light is displayed on the exterior surface of the diffuse spherical display, an optical path of the infrared light received by the wavelength filter and an optical path of the visible light reflected by the wavelength filter are in alignment.

2. The display apparatus of claim 1, further comprising a detector component that is configured to:
   receive an infrared image of the interior surface of the diffuse spherical display, the infrared image generated by the infrared camera; and
   based upon the infrared image, detect a position on the diffuse spherical display where a member is in physical contact with the exterior surface of the diffuse spherical display, the infrared image indicating where, on the exterior surface of the diffuse curved display, infrared light emitted by the emitter has reflected off of the member and passed back through the diffuse curved display.

3. The display apparatus of claim 2, wherein the detector component is further configured to detect a position of a second member on the exterior surface of the diffuse spherical display based upon the infrared image, where the member and the second member are simultaneously in physical contact with the exterior surface of the diffuse spherical display.

4. The display apparatus of claim 2, further comprising:
   a processor; and
   memory that comprises instructions that, when executed by the processor, cause the processor to:
      generate a normalized image based upon the infrared image; and
      detect the position of the member based upon the normalized image.

5. The display apparatus of claim 4, the instructions, when executed by the processor, further cause the processor to control images output by the projector based upon the position of the member detected by the detector component.

6. The apparatus of claim 2, the detector component is further configured to:
   receive a plurality of images of the interior surface of the diffuse spherical display; and
   detect a velocity of movement of the member along the exterior surface of the diffuse spherical display based upon the plurality of images, the projector configured to project imagery based upon the velocity of movement detected by the detector component.

7. The display apparatus of claim 2, the projector is configured to cause an image to be presented on the exterior surface of the diffuse spherical display based upon the detected position of the member on the exterior surface of the diffuse spherical display.

8. The display apparatus of claim 2, wherein the projector is controlled based upon the detected position.

9. The display apparatus of claim 2, wherein velocity of movement of the member across the exterior surface of the diffuse spherical display is determined based upon the detected position, and further wherein the projector is controlled based upon the determined velocity.

10. The display apparatus of claim 1, the ring-like configuration of light emitters comprises a light emitting diode that emits at least a portion of the infrared light.

11. The display apparatus of claim 10, the ring-like configuration of light emitters comprises a plurality of light emitting diodes that are configured in a ring-like manner around the aperture.

12. A method, comprising:
emitting light through an interior region of a display apparatus towards an interior surface of a diffuse spherical display, the diffuse spherical display is configured to display images on an exterior surface thereof, and the act of emitting comprises:
    using a ring-like configuration of light emitters positioned in the interior region of the display apparatus and around an aperture of the spherical display, emitting infrared light through the interior region and towards the interior surface of the diffuse spherical display, the infrared light emitted by the emitters passes through the interior surface of the diffuse spherical display and further through the exterior surface of the diffuse curved display; and
    using a projector, a wavelength filter, and a wide-angle lens that is positioned inside the aperture and flush with the ring-like configuration of light emitters, emitting visible light through the aperture, through the interior region, and towards the interior surface to project images on the exterior surface of the diffuse curved display, wherein the visible light emitted by the projector is reflected off of the wavelength filter and through the wide-angle lens; and
using an infrared camera, capturing an image of the interior surface of the diffuse curved display, wherein infrared light captured by the infrared camera passes through the wavelength filter and the wide-angle lens, and further wherein an optical path of the infrared light received by the wavelength filter and an optical path of the visible light reflected off of the wavelength filter are in alignment.

13. The method of claim 12, further comprising:
detecting a position of a member that is in physical contact with the exterior surface of the diffuse spherical display based upon the image.

14. The method of claim 13, further comprising:
displaying images on the exterior surface of the diffuse spherical display based upon the position on the exterior surface of the diffuse spherical display where the member is in physical contact with the exterior surface of the diffuse spherical display.

15. The method of claim 13, the act of detecting comprises:
normalizing the image captured by the camera; and
detecting the position of the member based upon the normalized image.

16. The method of claim 13, further comprising:
based upon the image, detecting a second position of a second member that is in physical contact with the exterior surface of the diffuse spherical display simultaneously with the member; and
projecting images onto the exterior surface of the diffuse spherical display based upon the position of the member and the second position of the second member.

17. The method of claim 13, further comprising:
detecting velocity of movement of the member across the exterior surface of the diffuse spherical display; and
controlling output of the projector based upon the velocity of movement of the member across the exterior surface of the diffuse curved display.

18. A display apparatus, comprising:
a spherical display that includes an aperture, the spherical display includes an interior surface and an exterior surface and is diffuse in nature, the interior surface defining a hollow central region of the spherical display;
a ring-like configuration of light-emitting diodes that is positioned around the aperture, the light-emitting diodes are configured to emit infrared light through the hollow central region and through the interior surface and then through the exterior surface of the spherical display;
a wide-angle lens that is positioned inside the aperture and flush with the ring-like configuration of light-emitting diodes;
a wavelength filter that is optically coupled to the wide-angle lens, infrared light received by way of the wide-angle lens passes through the wavelength filter;
an infrared camera that is optically coupled to the wavelength filter and the wide-angle lens, the infrared camera is configured to receive infrared light that passes through the wavelength filter; and
a projector that is optically coupled to the wavelength filter, the wavelength filter reflects visible light emitted from the projector through the wide-angle lens such that the visible light is displayed on the exterior surface of the spherical display, an optical axis of infrared light received by the wavelength filter is aligned with an optical axis of visible light reflected by the wavelength filter.

19. The display apparatus of claim 18, the infrared light received by the infrared camera is reflected from a finger in contact with the exterior surface of the spherical display.

20. The display apparatus of claim 18, the wavelength filter being a cold mirror.

\* \* \* \* \*